(12) United States Patent
Arai et al.

(10) Patent No.: US 12,503,063 B2
(45) Date of Patent: Dec. 23, 2025

(54) VEHICLE EXTERIOR STRUCTURE

(71) Applicant: TOYOTA JIDOSHA KABUSHIKI KAISHA, Toyota (JP)

(72) Inventors: Sho Arai, Nagoya (JP); Yoshiaki Miyazaki, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 377 days.

(21) Appl. No.: 18/134,668

(22) Filed: Apr. 14, 2023

(65) Prior Publication Data

US 2023/0331176 A1 Oct. 19, 2023

(30) Foreign Application Priority Data

Apr. 18, 2022 (JP) .................... 2022-068103

(51) Int. Cl.
*B62D 37/02* (2006.01)
*B60R 13/04* (2006.01)
*B62D 35/00* (2006.01)

(52) U.S. Cl.
CPC ............ *B60R 13/043* (2013.01); *B62D 35/00* (2013.01); *B62D 37/02* (2013.01)

(58) Field of Classification Search
CPC . B60R 13/043; B60R 13/04; B60R 2019/002; B62D 35/00; B62D 37/02; B62D 35/008

USPC .......... 296/1.08, 1.07, 151, 152, 146.9, 206, 296/208, 180.1; 180/903

See application file for complete search history.

(56) References Cited

U.S. PATENT DOCUMENTS

| | | | | |
|---|---|---|---|---|
| 5,320,151 | A * | 6/1994 | Wumer | B60R 13/00 144/368 |
| 8,910,987 | B1 * | 12/2014 | Greggs | B60R 13/04 296/1.08 |
| 2002/0108314 | A1 * | 8/2002 | Mantegazza | B60R 13/043 49/462 |
| 2010/0237660 | A1 * | 9/2010 | Grammer | F21S 45/33 296/208 |
| 2011/0012388 | A1 * | 1/2011 | Iida | B60J 10/87 296/146.9 |
| 2012/0280528 | A1 * | 11/2012 | Dellock | B60R 13/04 362/516 |
| 2016/0280162 | A1 * | 9/2016 | Yamada | B62D 35/00 |
| 2016/0288844 | A1 * | 10/2016 | Tanahashi | B62D 37/02 |

FOREIGN PATENT DOCUMENTS

JP 2019-172134 10/2019

* cited by examiner

*Primary Examiner* — Roger L Pang
(74) *Attorney, Agent, or Firm* — Dinsmore & Shohl LLP

(57) ABSTRACT

A decorating part is provided near a boundary between a front fender panel and a front door panel. For example, the decorating part is provided at a front end in a vehicle longitudinal direction of the front door panel. The decorating part is a member extending in a vehicle vertical direction. For example, the decorating part has a color darker than the color of the front fender panel and the front door panel.

7 Claims, 4 Drawing Sheets

VEHICLE EXTERIOR STRUCTURE

CROSS REFERENCE TO RELATED APPLICATION

This application claims priority to Japanese Patent Application No. 2022-068103 filed on Apr. 18, 2022, which is incorporated herein by reference in its entirety including the specification, claims, drawings, and abstract.

TECHNICAL FIELD

The present disclosure relates to a structure for making decorations around vehicle door panels.

BACKGROUND

There is a known technology for improving design quality of a vehicle exterior.

JP2019-172134A discloses a structure that improves design quality of a door frame. Specifically, the door frame is provided with an exterior member. The exterior member has an appearance part which is exposed to the outside of a vehicle. The exterior member is set to have its end part oppose an edge part of window glass so to provide a design having fewer parting lines around the window glass.

According to the structure disclosed in JP2019-172134A, design quality around the window glass can be improved, but there is still room to improve the design quality of the vehicle exterior.

The present disclosure relates to an improvement of the design quality of the vehicle exterior.

SUMMARY

One embodiment of the present disclosure is a vehicle exterior structure around a door panel and includes a decorating part which is provided at a front end in a vehicle longitudinal direction of the door panel and extended in a vehicle vertical direction.

By configuring as explained above, the decorating part acts as an accent at the front end of the door panel and can improve the design quality of a vehicle side surface.

The decorating part may have a color darker than a vehicle body color.

According to the present disclosure, the design quality of the vehicle exterior can be improved.

BRIEF DESCRIPTION OF THE DRAWINGS

Embodiments of the present disclosure will be described based on the following figures, wherein.

DESCRIPTION OF EMBODIMENTS

Figure 1:
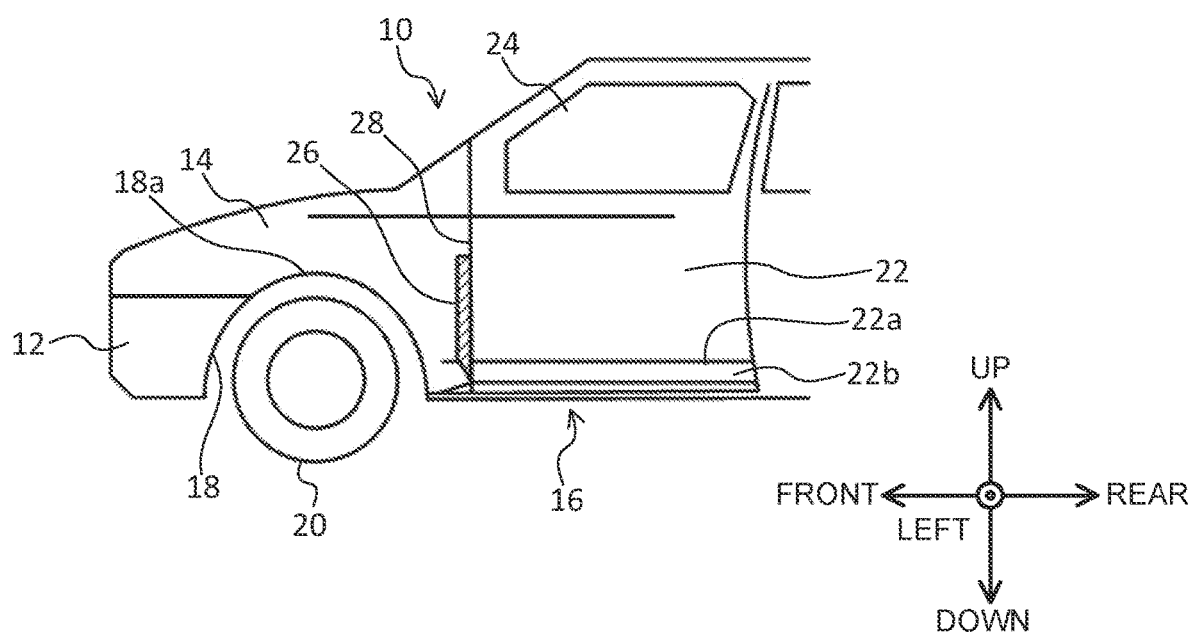
FIG. 1 is a side view of a vehicle front section as seen from a vehicle left side.
Figure 2:
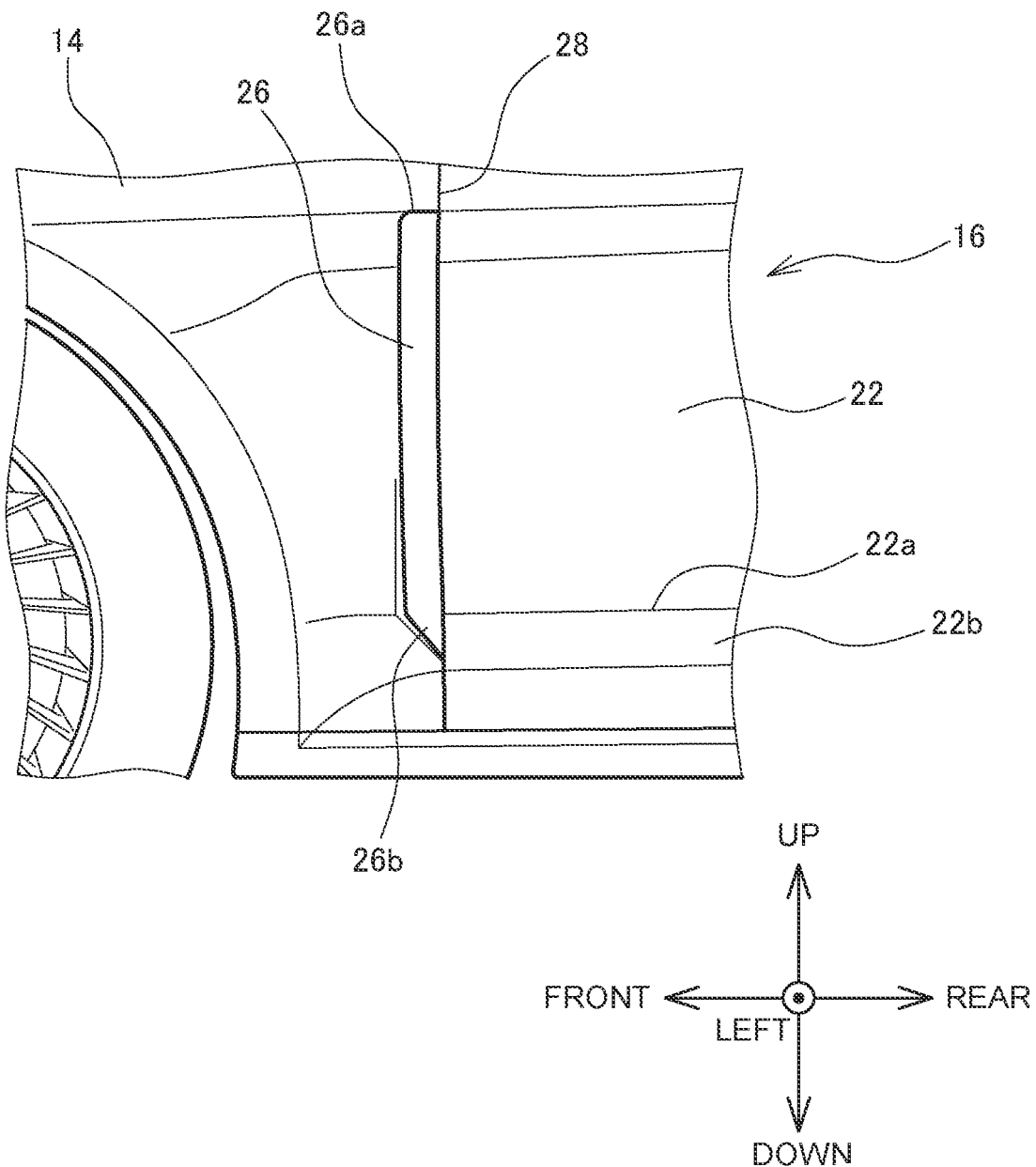
FIG. 2 is a side view of a front door panel as seen from the vehicle left side.

A vehicle exterior structure according to an embodiment will be explained with reference to FIG. 1 and FIG. 2. FIG. 1 is a side view of a vehicle front section as seen from the vehicle left side. FIG. 2 is a side view of a door panel as seen from the vehicle left side.

A vehicle 10 includes a front bumper 12, a front fender panel 14, and a front door 16. The front bumper 12 is a member configuring a front end of the vehicle 10. The front fender panel 14 is connected to the front bumper 12. The front bumper 12 and the front fender panel 14 configure a side surface of the front end of the vehicle 10. An opening 18 having a semicircularly cutout shape is formed along a rear part of the front bumper 12 and a lower end of the front fender panel 14, and a tire 20 is housed in the opening 18.

The front door 16 is provided at a vehicle rear side of the front fender panel 14. The front door 16 includes a front door panel 22 and side glass 24.

A decorating part 26 extending in a vehicle vertical direction is provided at a front end in a vehicle longitudinal direction of the front door panel 22. The decorating part 26 is a member made of resin, for example.

In the example shown in FIG. 1, along a boundary 28 between the front fender panel 14 and the front door panel 22, the decorating part 26 is provided on the surface of the front fender panel 14, but the decorating part 26 may be provided on the surface of the front door panel 22. The decorating part 26 can be provided on both of the front fender panel 14 and the front door panel 22 with the boundary 28 between them. Both cases are included in a category of the structure that the decorating part 26 is provided at the front end of the front door panel 22.

The decorating part 26 has a shape linearly extending in a vehicle vertical direction but may have a shape including a partly curved portion.

For example, an upper end 26a at a vehicle upper side of the decorating part 26 is provided at the vehicle upper side higher than an upper end 18a of the opening 18, and the decorating part 26 is provided to extend toward the vehicle upper side beyond the upper end 18a of the opening 18. The above configuration is merely one example, and the upper end 26a of the decorating part 26 may be positioned at the same height as the upper end 18a of the opening 18 or at a vehicle lower side below the upper end 18a.

A ridgeline 22a extending in the vehicle longitudinal direction is formed at a vehicle lower side of the front door panel 22. A portion 22b at a vehicle lower side below the ridgeline 22a is inclined to the inner side of the vehicle toward the vehicle lower side.

A lower end 26b at the vehicle lower side of the decorating part 26 is at the vehicle lower side below the ridgeline 22a, and the decorating part 26 is provided to extend toward the vehicle lower side below the ridgeline 22a.

The lower end 26b is formed so that its width in the vehicle longitudinal direction becomes gradually narrower toward the vehicle lower side. For example, the side on the vehicle front side of the lower end 26b is formed obliquely from the vehicle front side toward the vehicle rear side.

For example, the decorating part 26 is a member with no pattern. The decorating part 26 has a color of the same color system (for example, a color having a color) similar to the color of the vehicle body (for example, the front fender panel 14 and the front door panel 22), a similar color (for example, a color having a similar hue), or an complementary color (for example, a color on the opposite side of the color wheel). Of course, it is needless to say that the decorating part 26 may be a member having a partial or full pattern or may have a color whose hue and brightness are changed continuously depending on a position on the surface of the decorating part 26.

As described above, the decorating part 26 extending in a vehicle vertical direction is provided along the boundary between the front fender panel 14 and the front door panel 22, so that the decorating part 26 acts as an accent and can add a visual effect to a flat vehicle side surface.

For example, when a color darker than the color of the vehicle body (such as the front fender panel 14 and the front door panel 22) is adopted for the color of the decorating part 26, the color of the decorating part 26 acts as an accent color. Thus, there are provided effects to set off the color of the front fender panel 14 and the front door panel 22 and to provide a variety of designs for the front fender panel 14 and the front door panel 22.

Figure 3:
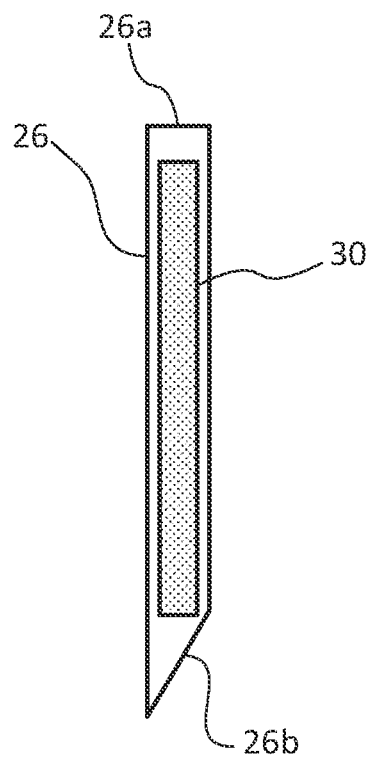
FIG. 3 is a diagram showing a back surface of a decorating part.

A charge suppressing material can also be attached to the back surface of the decorating part 26. FIG. 3 shows the back surface of the decorating part 26. The back surface of the decorating part 26 is provided with an electrostatic tape 30 which is one example of the charge suppressing material. For example, the electrostatic tape 30 is provided covering from the upper end 26a to the lower end 26b of the decorating part 26. The electrostatic tape 30 is, for example, a conductive aluminum tape. When the decorating part 26 is provided on the vehicle body, the electrostatic tape 30 attached to the back surface of the decorating part 26 is in contact with the vehicle body.

Generally, air is positively charged, so that when the vehicle body is charged with positive static electricity, a repulsive force (repellent force) generated by the static electricity acts between an airflow and the vehicle body. The airflow is separated from the vicinity of the outer surface of the vehicle body by the repulsive force, and a boundary layer formed between the airflow and the vehicle body is increased. When the boundary layer is increased, a target aerodynamic characteristic cannot be obtained, and there is a possibility that driving performance, steering stability, and the like are lowered. The driving performance, steering stability, and the like can be improved by reducing the repulsive force to make the boundary layer thin.

For example, air has a tendency to be positively charged in a place where there are numerous asphalt roads, man-made buildings, and the like. On the contrary, air has a tendency to be negatively charged in a place where there are numerous plants, such as forests. Vehicle outer plates, bumpers, side view mirrors, door knobs, and glass easily become positively charged.

Since the airflow is disturbed at a rear side of the opening 18 of the front fender panel 14, there is a possibility that the driving performance and steering stability are lowered. Static electricity near the front fender panel 14 can be electrically neutralized and removed by the electrostatic tape 30, which self-discharges. Therefore, a positive potential can be lowered by reducing the static electricity charged on the vehicle body surface, and the repellent force hardly occurs between the positively charged vehicle body surface and the positively charged airflow. As a result, the airflow near the front fender panel 14 is not easily separated, and disturbance of the airflow can be reduced. For example, the airflow disturbed at the rear side of the opening 18 can be rectified. Air resistance of the vehicle is reduced and vibrations of the vehicle due to the airflow disturbance are suppressed by reducing the airflow disturbance, thereby improving the vehicle driving performance, steering stability, and the like.

Figure 4:
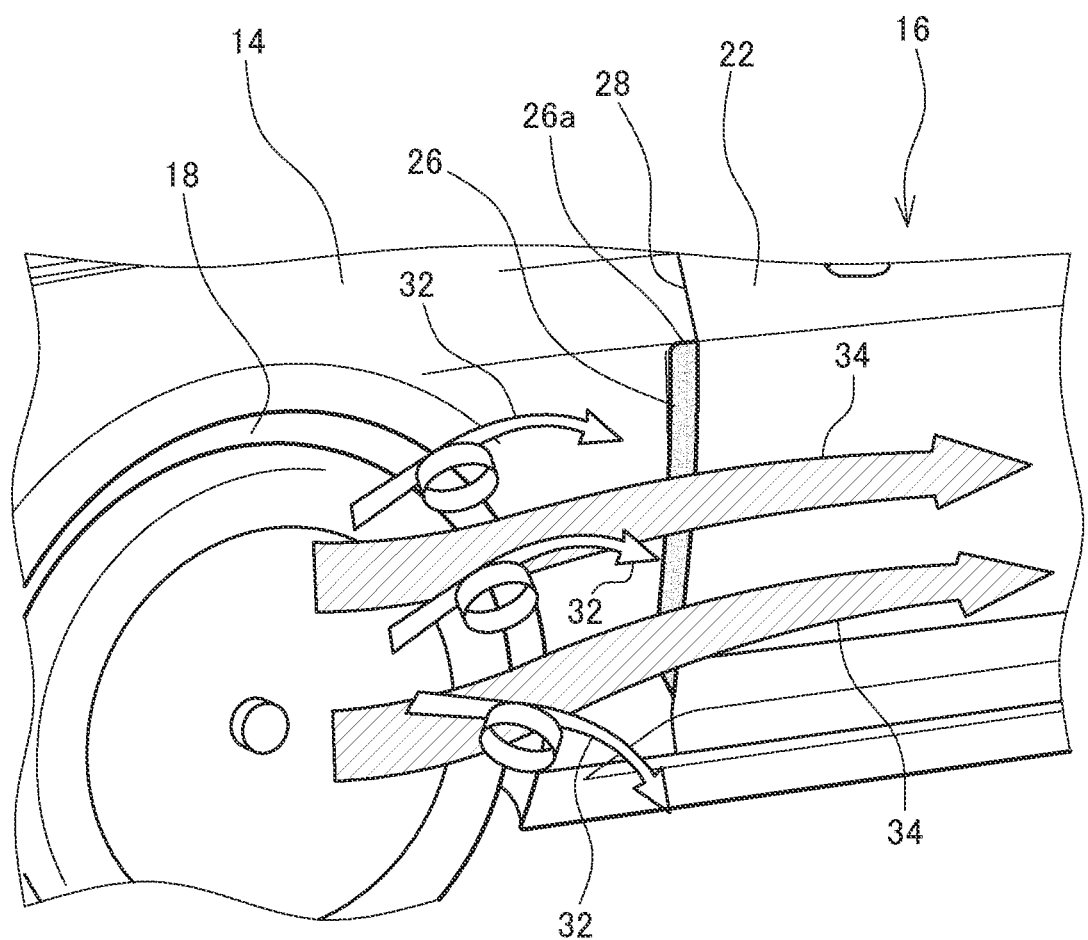
FIG. 4 is a perspective view of a door panel as seen from vehicle's left front and side.

FIG. 4 schematically shows the airflow around the front fender panel 14. Reference numeral 32 indicates the airflow when the electrostatic tape 30 is not provided. Reference numeral 34 indicates the airflow when the electrostatic tape 30 is provided.

As indicated by reference numeral 32, the airflow is disturbed at the rear side of the opening 18. For example, the airflow at the rear side of the opening 18 is disturbed by unevenness of the opening 18 and the front fender.

As indicated by reference numeral 34, the airflow at the rear side of the opening 18 can be attracted toward the vehicle body and rectified when the electrostatic tape 30 is attached to the back surface of the decorating part 26. Since the airflow disturbance can be reduced, the vehicle driving performance, steering stability, and others can be improved.

According to the present embodiment, the provision of the decorating part 26 on the vehicle improves the design quality of the vehicle 10 and attains a straightening effect.

A right-side surface of the vehicle 10 is also provided with the decorating part 26 having the electrostatic tape 30 near the boundary 28 between the front fender panel 14 and the front door panel 22. Thus, similar to the left-side surface of the vehicle 10, the design quality of the vehicle 10 is improved, and the airflow straightening effect is obtained.

The invention claimed is:

1. A vehicle exterior structure, including:
   a front fender panel;
   a front door disposed adjacent to a vehicle rear side of the front fender panel, the front door having a front door panel that is exposed to the outside of a vehicle; and
   a decorating part which is provided adjacent to a boundary between the front fender panel and the front door on either the front fender panel or the front door panel, or both and extended in a vehicle vertical direction,
   wherein the decorating part includes a charge suppressing material provided on a back surface of the decorating part,
   wherein the front fender panel has a wheel arch serving as an opening in which a tire is housed,
   wherein an area where the decorating part is present in the vehicle vertical direction at least partially overlaps an area where the wheel arch is present in the vehicle vertical direction, and
   wherein the charge suppressing material is an electrostatic tape that electrically neutralizes and removes static electricity near the front fender panel.

2. The vehicle exterior structure according to claim 1, wherein the decorating part has a color darker than colors of the front fender panel and the front door panel.

3. The vehicle exterior structure according to claim 1, wherein an upper end of the decorating part is located more toward a vehicle upper side than an upper end of the wheel arch.

4. The vehicle exterior structure according to claim 1, wherein the door panel includes:
   a ridgeline extending in a vehicle longitudinal direction slightly more toward an upper side than a lower end edge of the door panel; and
   a lower portion below the ridgeline, the lower portion being inclined toward an inner side in a vehicle width direction as it gets closer to a vehicle lower side,
   wherein the decorating part is disposed adjacent to the boundary on the front fender panel, and
   wherein a lower edge of the decorating part is inclined toward a vehicle rear side as it gets closer to a vehicle lower side.

5. The vehicle exterior structure according to claim 1, wherein the decorating part is provided adjacent to the boundary between the front fender panel and the front door panel on the front fender panel.

6. The vehicle exterior structure according to claim 1, wherein the decorating part is formed of a resin and the electrostatic tape is provided on the back surface of the decorating part.

7. The vehicle exterior structure according to claim 6, wherein the electrostatic tape contacts the front door panel.

\* \* \* \* \*